United States Patent
Li et al.

(10) Patent No.: US 11,811,328 B2
(45) Date of Patent: Nov. 7, 2023

(54) ISOLATED CONVERSION APPARATUS WITH MAGNETIC BIAS BALANCE CONTROL AND METHOD OF CONTROLLING THE SAME

(71) Applicant: DELTA ELECTRONICS, INC., Taoyuan (TW)

(72) Inventors: Chih-Hsien Li, Taoyuan (TW); Yi-Ping Hsieh, Taoyuan (TW); Hung-Chieh Lin, Taoyuan (TW); Hung-Yu Huang, Taoyuan (TW); Ciao-Yin Pan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 150 days.

(21) Appl. No.: 17/570,026

(22) Filed: Jan. 6, 2022

(65) Prior Publication Data

US 2022/0239230 A1   Jul. 28, 2022

(30) Foreign Application Priority Data

Jan. 28, 2021   (CN) ......................... 202110120358.8

(51) Int. Cl.
*H02M 3/335* (2006.01)
*H02M 1/00* (2006.01)

(52) U.S. Cl.
CPC ..... *H02M 3/33523* (2013.01); *H02M 1/0009* (2021.05)

(58) Field of Classification Search
CPC .......... H02M 3/33523; H02M 1/0009; H02M 3/33571; H02M 3/33573
See application file for complete search history.

(56) References Cited

U.S. PATENT DOCUMENTS

| 9,257,913 B1* | 2/2016 | McDonald .......... H02M 3/3376 |
| 2011/0260631 A1* | 10/2011 | Park ...................... H05B 45/39 315/165 |

* cited by examiner

*Primary Examiner* — Adolf D Berhane
*Assistant Examiner* — Afework S Demisse
(74) *Attorney, Agent, or Firm* — Muncy, Geissler, Olds & Lowe, P.C.

(57) ABSTRACT

An isolated conversion apparatus with magnetic bias balance control includes an isolated converter, a controller, and a magnetic bias balance circuit. The isolated converter includes a transformer, and a primary side of the transformer includes a primary-side winding and at least one switch bridge arm. The controller is coupled to the at least one switch bridge arm, and provides a pulse width modulation (PWM) signal group to control the at least one switch bridge arm. The magnetic bias balance circuit is coupled to two ends of the primary-side winding and the controller, and provides a compensation voltage to the controller according to an average voltage of a winding voltage across the two ends of the primary-side winding. The controller adjusts a duty cycle of the PWM signal group according to the compensation voltage to correct the magnetic bias.

17 Claims, 9 Drawing Sheets

ISOLATED CONVERSION APPARATUS WITH MAGNETIC BIAS BALANCE CONTROL AND METHOD OF CONTROLLING THE SAME

BACKGROUND

Technical Field

The present disclosure relates to a conversion apparatus with magnetic bias balance control and a method of controlling the same, and more particularly to an isolated conversion apparatus with magnetic bias balance control and a method of controlling the same.

Description of Related Art

The statements in this section merely provide background information related to the present disclosure and do not necessarily constitute prior art.

Please refer to FIG. 1A, which shows a circuit diagram of a conventional full-bridge phase-shift converter. Due to the difference of the hardware circuit or the signals of controlling control switches Q1-Q4 with different duty cycles, the average positive and negative voltage across the transformer 12 is not zero. Therefore, the phenomenon that the average amount of magnetizing current is not zero (referred to as magnetic bias) occurs so that the magnetizing inductance of the transformer 12 saturates and the inductance value decreases rapidly, causing the risk of excessive current on the primary side of the converter.

In the prior art, a capacitor C is usually connected in series on the primary side of the transformer 12 to balance the positive and negative half-cycle voltage of the transformer 12 to avoid the occurrence of magnetic bias. However, this control method requires adding a capacitor C to the circuit, which will relatively increase the circuit cost and circuit volume. Another common solution is shown in FIG. 1B, where a current sensor CT is added to the full-bridge circuit and the current-peak control method is performed. This control method will make the half cycle of the magnetic bias close the switch duty cycle earlier due to the higher current so that the product of voltage and time on the side of the magnetic bias can be reduced to achieve the effect of balancing the magnetic bias. However, this control method needs to add the current sensor CT in the circuit, which also increases the circuit cost and circuit volume.

Accordingly, the isolated conversion apparatus with magnetic bias balance control and the method of controlling the same are provided to achieve the effect of balancing the magnetic bias without adding the isolation capacitor and the current sensor.

SUMMARY

In order to solve the above-mentioned problems, the present disclosure provides an isolated conversion apparatus with magnetic bias balance control. The isolated conversion apparatus includes an isolated converter, a controller, and a magnetic bias balance circuit. The isolated converter includes a transformer with a primary side, and the primary side has a primary-side winding and at least one switch bridge arm. The controller is coupled to the at least one switch bridge arm, and provides a PWM (pulse width modulation) signal group to control the at least one switch bridge arm. The magnetic bias balance circuit is coupled to two ends of the primary-side winding and the controller, and provides a compensation voltage to the controller according to an average voltage value of a winding voltage across the two ends of the primary-side winding. The controller adjusts a duty cycle of the PWM signal group according to the compensation voltage.

In order to solve the above-mentioned problems, the present disclosure provides a method of controlling magnetic bias balance of an isolated conversion apparatus. The isolated conversion apparatus includes an isolated converter, and the isolated converter includes a transformer and at least one switch bridge arm coupled to a primary side of the transformer. The method includes steps of: (a) providing a PWM (pulse width modulation) signal group to control switching the at least one bridge arm so that the isolated converter converting an input voltage into an output voltage, (b) providing a compensation voltage corresponding to a magnetic bias of the transformer according to a winding voltage across two ends of a primary-side winding of the transformer, and (c) adjusting a duty cycle of the PWM signal group according to the compensation voltage to correct the magnetic bias.

Accordingly, the isolated conversion apparatus samples the winding voltage across the two ends of the primary-side winding of the transformer, the filter circuit acquires the average voltage value of the winding voltage, and the controller controls the average voltage value to be zero so as to correct the magnetic bias. The magnetic bias compensation of the transformer can be simply completed without using the control method of adding the current sensor and without adding the isolation capacitor, thereby reducing the circuit volume and the circuit cost.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
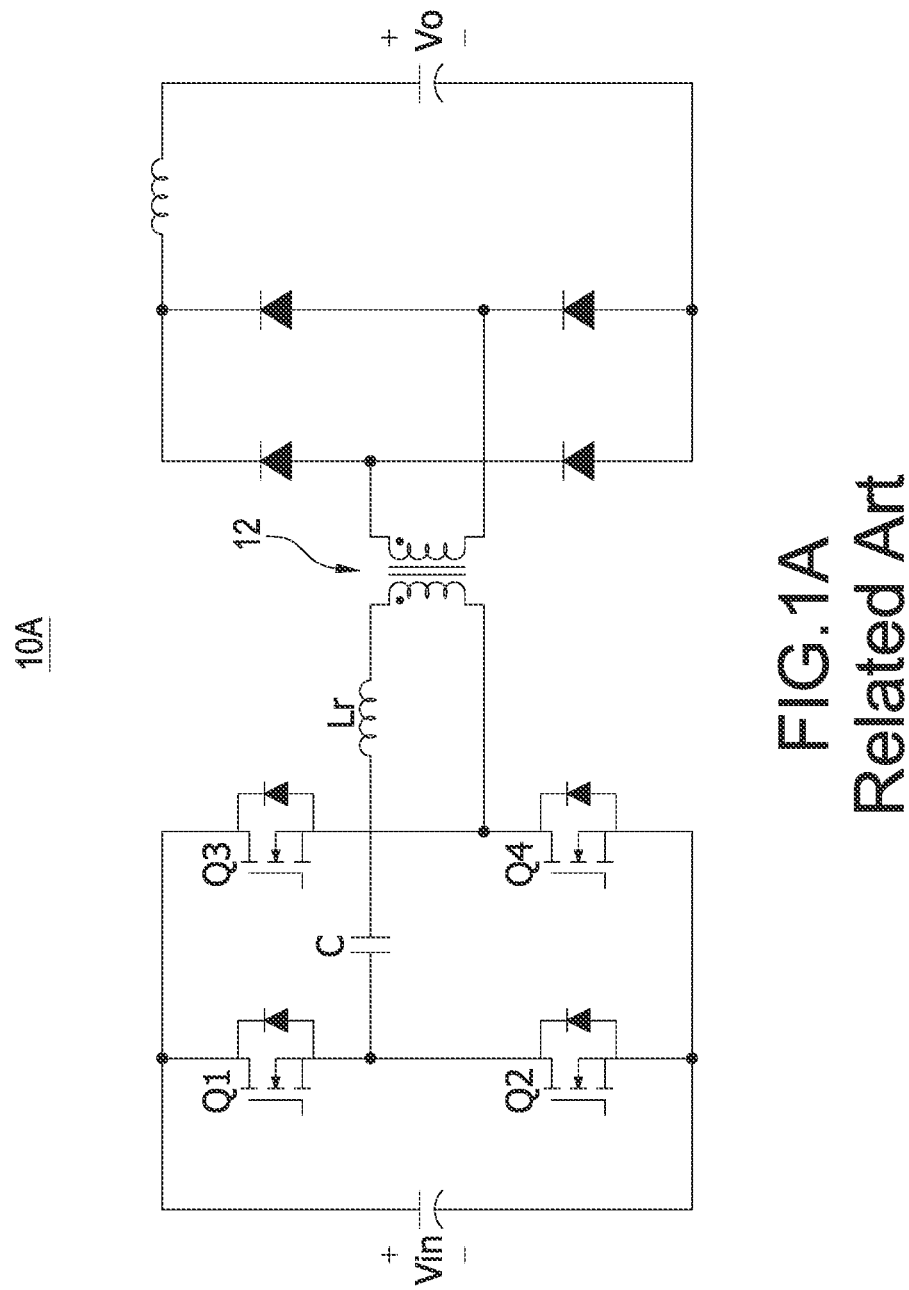
FIG. 1A is a circuit diagram of a conventional full-bridge phase-shift converter.
Figure 1B:
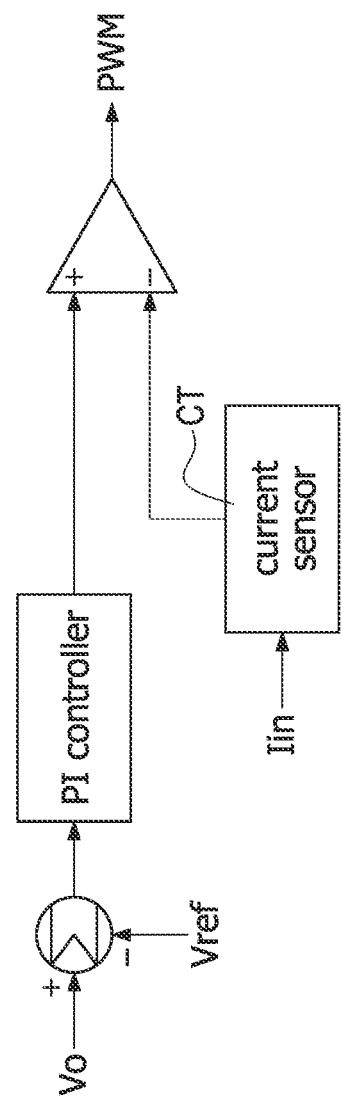
FIG. 1B is a block diagram of a peak current control.

Reference will now be made to the drawing figures to describe the present disclosure in detail. It will be understood that the drawing figures and exemplified embodiments of present disclosure are not limited to the details thereof.

Figure 2:
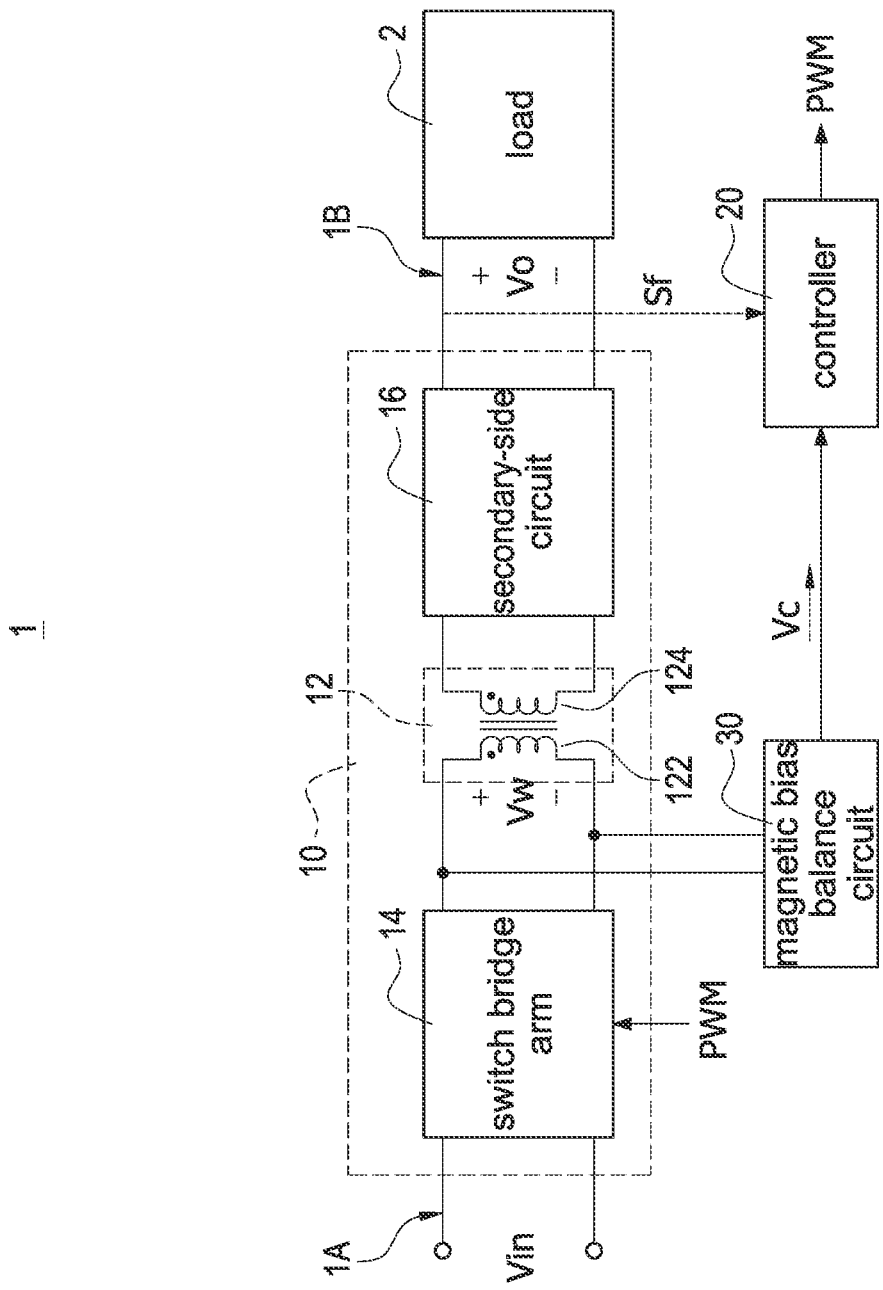
FIG. 2 is a block circuit diagram of an isolated conversion apparatus with magnetic bias balance control according to the present disclosure.

Please refer to FIG. 2, which shows a block circuit diagram of an isolated conversion apparatus with magnetic bias balance control according to the present disclosure. An input end 1A of the isolated conversion apparatus 1 receives an input voltage Vin, converts the input voltage Vin into an output voltage Vo, and supplies power to a load 2 through an output end 1B. The isolated conversion apparatus 1 includes an isolated converter 10, a controller 20, and a magnetic bias balance circuit 30. The isolated converter 10 includes a transformer 12, at least one switch bridge arm 14, and a secondary-side circuit 16. A primary side of the transformer 12 includes a primary-side winding 122, and a secondary side of the transformer 12 includes a secondary-side winding 124. The switch bridge arm 14 is coupled to the input end 1A and the primary-side winding 122, and the secondary-side circuit 16 is coupled to the secondary-side winding 124 and the output end 1B. The controller 20 is coupled to the switch bridge arm 14 and the output end 1B, and provides a PWM (pulse width modulation) signal group PWM to control the switch bridge arm 14 according to a feedback signal Sf transmitted from the output end 1B. The magnetic bias balance circuit 30 is coupled to two ends of the primary-side winding 122 and the controller 20, and provides a compensation voltage Vc corresponding to a magnetic bias of the transformer 12 to the controller 20 according to a winding voltage Vw across the two ends of the primary-side winding 122. The controller 20 adjusts a duty cycle of the PWM signal group PWM according to the compensation voltage Vc to correct the magnetic bias of the transformer 12, thereby achieving the effect of magnetic bias balance.

Figure 3:
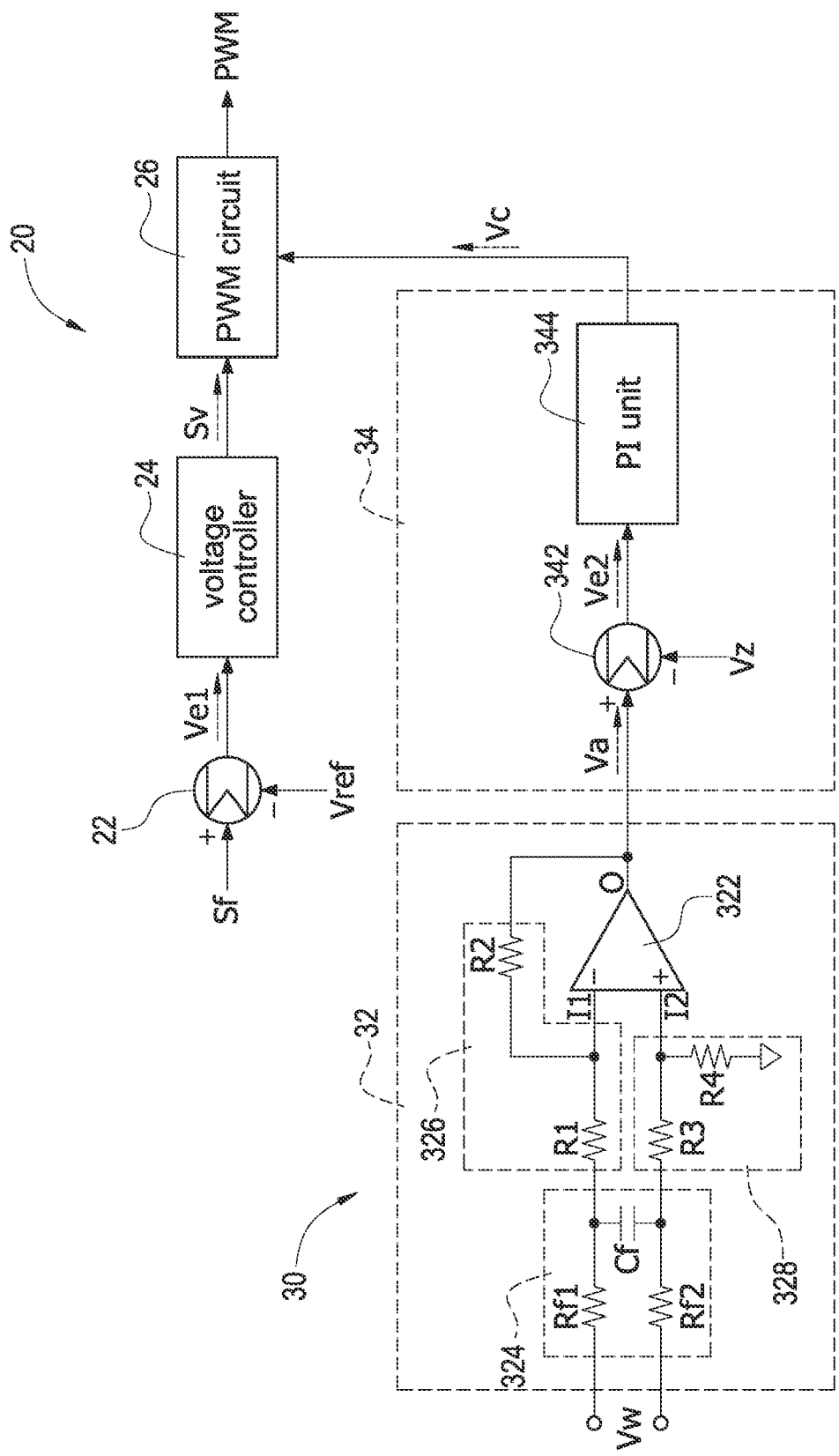
FIG. 3 is a block circuit diagram of a controller and a magnetic bias balance circuit according to the present disclosure.

Please refer to FIG. 3, which shows a block circuit diagram of a controller and a magnetic bias balance circuit according to the present disclosure, and also refer to FIG. 2. The controller 20 includes a first operational circuit 22, a voltage controller 24, and a PWM circuit 26. The first operational circuit 22 is coupled to the output end 1B, and provides a first error value Ve1 to the voltage controller 24 according to a difference between the feedback signal Sf and the reference voltage Vref. The voltage controller 24 is a compensator for general feedback control, receives the first error value Ve1 to generate a voltage control signal Sv according to the first error value Ve1, and provides the voltage control signal Sv to the PWM circuit 26. The PWM circuit 26 generates the PWM signal group PWM according to the voltage control signal Sv, and provides the PWM signal group PWM to the switch bridge arm 14 so as to regulate/stabilize a voltage value of the output voltage Vo by switching the switch bridge arm 14. In one embodiment, the internal structure of the controller 20 is only the most basic feedback control structure, and it is not limited that the controller 20 can only be implemented with this circuit structure.

The magnetic bias balance circuit 30 includes a sampling circuit 32 and an offset compensation circuit 34. The sampling circuit 32 is coupled to the two ends of the primary-side winding 122. The offset compensation circuit 34 is coupled to the sampling circuit 32 and outputs the compensation voltage Vc to the PWM circuit 26 of the controller 20. In one embodiment, the sampling circuit 32 is a differential filter circuit, and the differential filter circuit (i.e., the sampling circuit 32) includes an operational amplifier 322, a filter circuit 324, a first voltage divider circuit 326, and a second voltage divider circuit 328. The operational amplifier 322 has a first input end I1, a second input end I2, and an output end O, and the output end O of the operational amplifier 322 is coupled to the offset compensation circuit 34. A first end of the filter circuit 324 is coupled to the two ends of the primary-side winding 122, and a second end of the filter circuit 324 is coupled to the first voltage divider circuit 326 and the second voltage divider circuit 328. The filter circuit 324 includes a first filter resistor Rf1, a second filter resistor Rf2, and a filter capacitor Cf. A first end of the first filter resistor Rf1 is coupled to a first end of the primary-side winding 122, and a second end of the first filter resistor Rf1 is coupled to the first voltage divider circuit 326. A first end of the second filter resistor Rf2 is coupled to a second end of the primary-side winding 122, and a second end of the second filter resistor Rf2 is coupled to the second voltage divider circuit 328. A first end of the filter capacitor Cf is coupled to the second end of the first filter resistor Rf1, and a second end of the filter capacitor Cf is coupled to the second end of the second filter resistor Rf2.

The first voltage divider circuit 326 includes a first resistor R1 and a second resistor R2 connected to the first resistor R1 in series. The first resistor R1 is coupled to the first end of the filter capacitor Cf, and two ends of the second resistor R2 are respectively coupled to the first input end I1 and the output end O of the operational amplifier 322. The second voltage divider circuit 328 includes a third resistor R3 and a fourth resistor R4 connected to the third resistor R3 in series. The third resistor R3 is coupled to the second end of the filter capacitor Cf, and two ends of the fourth resistor R4 are respectively coupled to the second input end I2 and a negative end. The sampling circuit 32 filters, averages, and gains the winding voltage Vw through the filter circuit 324, the operational amplifier 322, the first voltage divider circuit 326, and the second voltage divider circuit 328 to generate an average voltage Va corresponding to an average voltage value of the winding voltage Vw. In one embodiment, the implementation of the sampling circuit 32 is only a schematic analog circuit, and it is not limited to only being implemented with the circuit structure of the differential filter circuit in FIG. 3. An example of another possible implementation may acquire the average voltage values of the winding voltage Vw in the positive half cycle and the negative half cycle. Afterward, the average voltage value of the positive half cycle is subtracted from the average voltage value of the negative half cycle to acquire an average voltage Va corresponding to an average voltage value of the winding voltage Vw for the offset compensation circuit 34 to control the difference to be zero. Such an implementation is advantageous for implementation using a processor or a microcontroller. In other words, as long as the circuit or method corresponding to the average voltage value of the winding voltage Vw can be acquired, it can be applied to the sampling circuit 32 of the present disclosure.

The offset compensation circuit 34 is a proportional integral controller, and the proportional integral controller (i.e., the offset compensation circuit 34) includes a second operational circuit 342 and a proportional integral unit 344. The second operational circuit 342 provides a second error value Ve2 according to a voltage difference between the average voltage Va and a zero voltage Vz. In particular, the zero voltage Vz represents a target value under the magnetic bias balance, and it is usually a reference voltage of 0 volt. The proportional integral unit 344 receives the second error value Ve2, generates a compensation voltage Vc corresponding to a direction and a magnitude of the magnetic bias according to the second error value Ve2, and provides the compensation voltage Vc to the PWM circuit 26 so that the PWM circuit 26 adjusts the duty cycle of the PWM signal group PWM to correct the magnetic bias according to the compensation voltage Vc. In one embodiment, the implementation of the offset compensation circuit 34 is only a preferred implementation, and is not limited to only being implemented in the form of the proportional integral controller of FIG. 3. In other words, any controller structure that can generate the compensation voltage Vc according to the average voltage Va and the zero voltage Vz to make the average voltage Va close to zero volt can be applied to the offset compensation circuit 34 of the present disclosure. The offset compensation circuit 34 may be also implemented by a processor or a microcontroller with digital control.

Figure 4A:
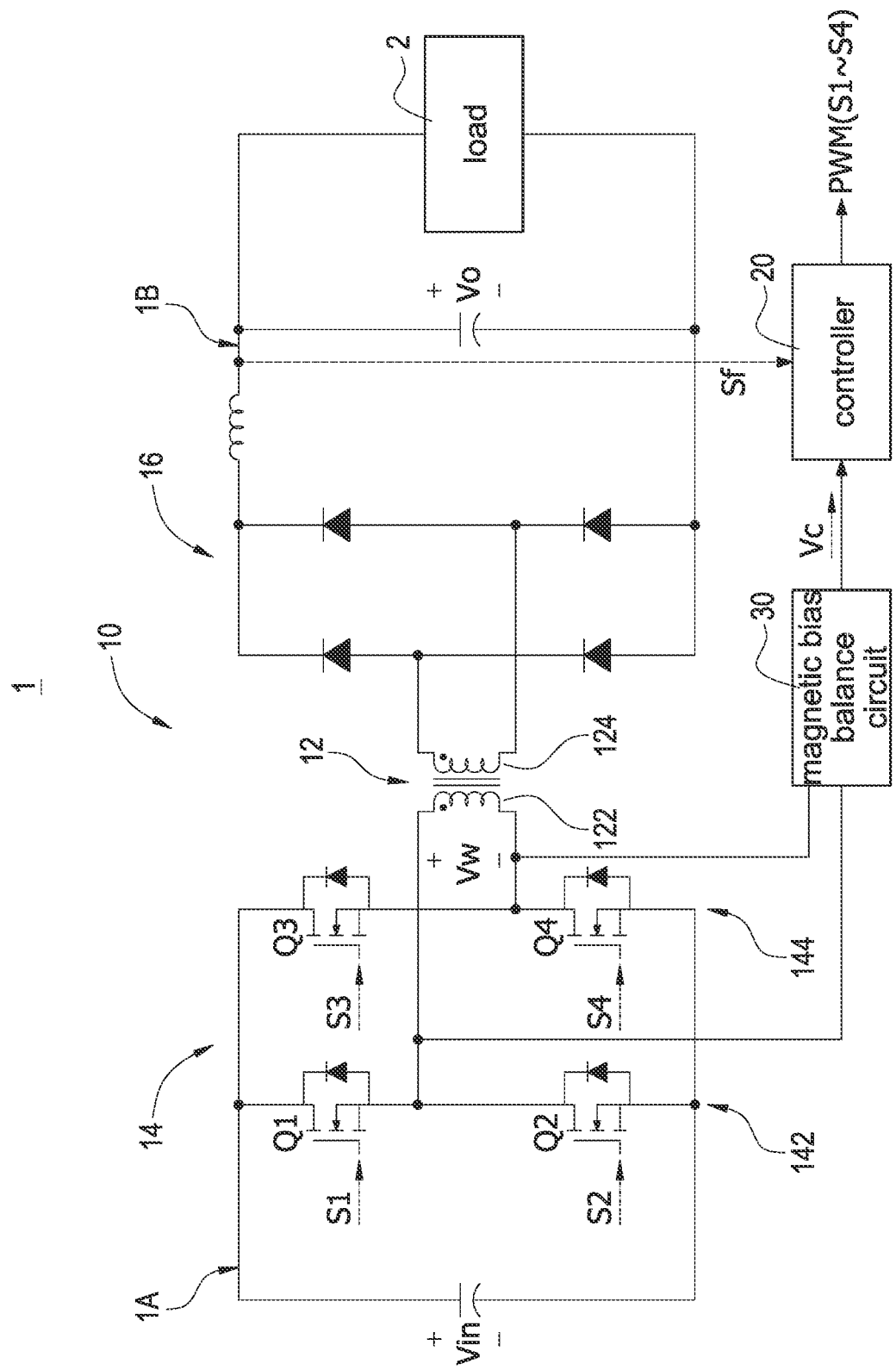
FIG. 4A is a block circuit diagram of an isolated converter according to a first embodiment of the present disclosure.

Please refer to FIG. 4A, which shows a block circuit diagram of an isolated converter according to a first embodiment of the present disclosure, and also refer to FIG. 2 to FIG. 3. The isolated converter 10 of the isolated conversion apparatus 1 is a full-bridge converter, and therefore the switch bridge arm 14 includes a first bridge arm 142 and a second bridge arm 144. The first bridge arm 142 has a first switch Q1 and a second switch Q2 connected to the first switch Q1 in series. The second bridge arm 144 is connected to the first bridge arm 142 in parallel, and the second bridge arm 144 has a third switch Q3 and a fourth switch Q4 connected to the third switch Q3 in series. The first end of the primary-side winding 122 is coupled to a node between the first switch Q1 and the second switch Q2, and the second end of the primary-side winding 122 is coupled to a node between the third switch Q3 and the fourth switch Q4. The PWM signal group PWM has a first control signal S1 of controlling the first switch Q1, a second control signal S2 of controlling the second switch Q2, a third control signal S3 of controlling the third switch Q3, and a fourth control signal S4 of controlling the fourth switch Q4. The controller 20 provides control signals S1-S4 to respectively switch the switches Q1-Q4 according to the feedback signal Sf transmitted from the output end 1B so that the isolated converter 10 converts the input voltage Vin into the output voltage Vo. The magnetic bias balance circuit 30 is coupled to the two ends of the primary-side winding 122, and provides the compensation voltage Vc corresponding to the magnetic bias of the transformer 12 to the controller 20 according to the winding voltage Vw, and therefore the controller 20 adjusts the duty cycle of the control signals S1-S4 to correct the magnetic bias of the transformer 12, thereby achieving the effect of magnetic bias balance.

Figure 4B:
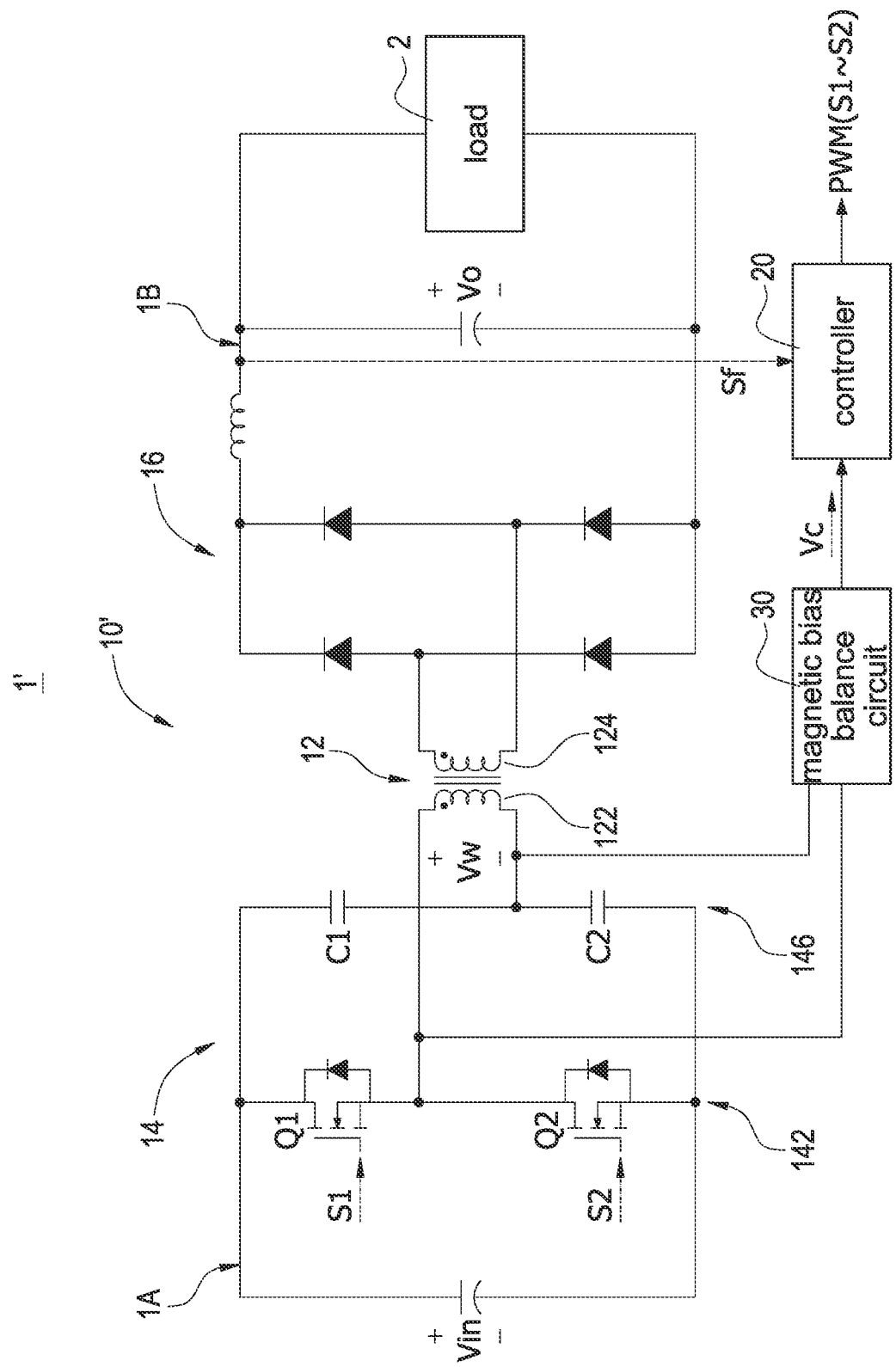
FIG. 4B is a block circuit diagram of the isolated converter according to a second embodiment of the present disclosure.
Figure 5A:
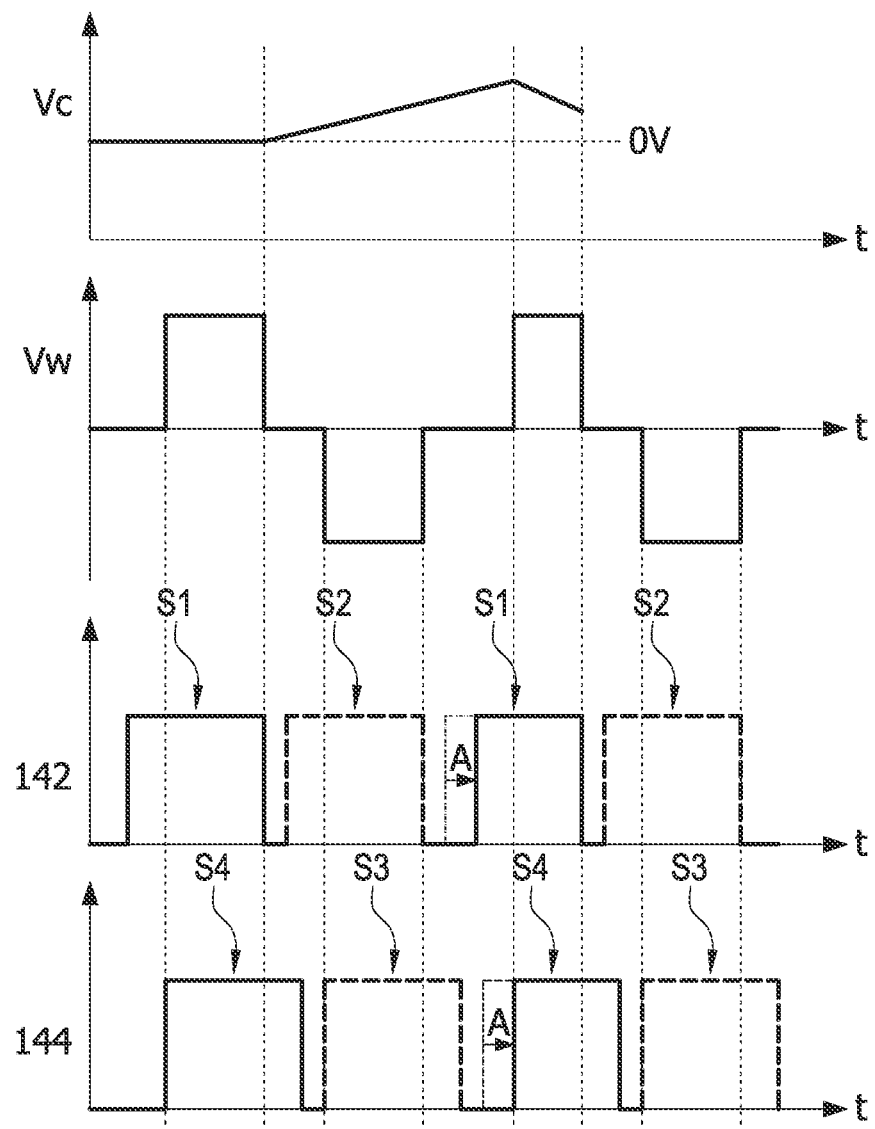
FIG. 5A is a schematic waveform diagram of a positive magnetic bias correction of an isolated conversion apparatus according to a first embodiment of the present disclosure.
Figure 5B:
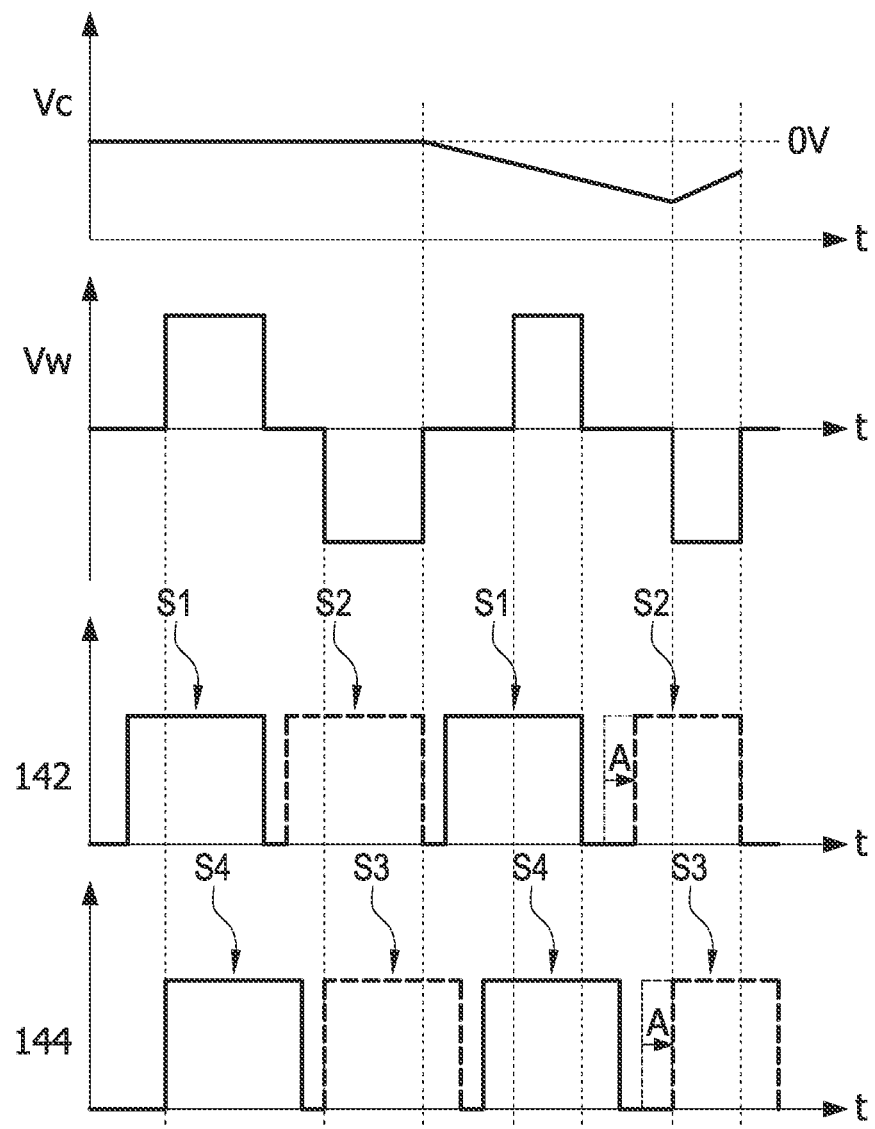
FIG. 5B is a schematic waveform diagram of a negative magnetic bias correction of the isolated conversion apparatus according to a second embodiment of the present disclosure.

Please refer to FIG. 5A and FIG. 5B, which show schematic waveform diagrams of a positive magnetic bias correction and a negative magnetic bias correction of the isolated conversion apparatus according to a first embodiment of the present disclosure, and also refer to FIG. 2 to FIG. 4A. The compensation voltage Vc provided by the magnetic bias balance circuit 30 corresponds to a magnetic bias direction of the transformer 12, and the magnetic bias direction is a direction of positive half-cycle bias or a direction of negative half-cycle bias. As shown in FIG. 5A, when the magnetic bias direction of the transformer 12 is positive, an effective duty cycle of the winding voltage Vw in the positive half cycle is greater than that in the negative half cycle. At this condition, the compensation voltage Vc provided by the magnetic bias balance circuit 30 is positive (i.e., greater than 0 volt) according to the winding voltage Vw. The controller 20 decreases (in the direction of an arrow A) the duty cycle of the first control signal S1 and the duty cycle of the fourth control signal S4 according to the positive compensation voltage Vc so as to correct the magnetic flux that wants to bias to the positive value. The effective duty cycle refers to the duty cycle when the winding voltage Vw actually has a voltage. Take the full-bridge converter shown in FIG. 4A as an example, the control signals S1, S4 can be synchronously turned on and turned off, and the effective duty cycle is equal to the duty cycle of the control signal S1 or the duty cycle of the control signal S4. If the phase shift control is used, since the control signals S1, S4 will not be synchronized, there will be voltage on the winding only when the control signals S1, S4 are simultaneously in high level, and therefore the effective duty cycle is the time when the control signals S1, S4 overlap in high level.

On the contrary, please refer to FIG. 5B. When the magnetic bias direction of the transformer 12 is negative, the effective duty cycle of the winding voltage Vw in the negative half cycle is greater than that in the positive half cycle. At this condition, the compensation voltage Vc provided by the magnetic bias balance circuit 30 is negative (i.e., less than 0 volt) according to the winding voltage Vw. The controller 20 decreases (in the direction of an arrow A) the duty cycle of the second control signal S2 and the duty cycle of the third control signal S3 according to the negative compensation voltage Vc so as to correct the magnetic flux that wants to bias to the negative value. In one embodiment, the correspondence between the positive and negative values of the winding voltage Vw and the compensation voltage Vc is only an example, and it can also be conversely that the winding voltage Vw with a larger positive half-cycle effective duty cycle corresponds to a negative compensation voltage Vc. As long as an effective duty cycle of the half cycle with larger effective duty cycle can be decreased.

Please refer to FIG. 4B, which shows a block circuit diagram of the isolated converter according to a second embodiment of the present disclosure, and also refer to FIG. 2 to FIG. 4A and FIG. 5A and FIG. 5B. The difference between the isolated conversion apparatus 1' of this embodiment and the isolated conversion apparatus 1 shown in FIG. 4A is that the isolated converter 10' of the isolated conversion apparatus 1' is a half-bridge converter. The switch bridge arm 14 includes a first bridge arm 142 and a capacitor assembly 146. The first bridge arm 142 has a first switch Q1 and a second switch Q2 connected to the first switch Q1 in series. The capacitor assembly 146 is connected to the first bridge arm 142 in parallel, and the capacitor assembly 146 has a first capacitor C1 and a second capacitor C2 connected to the first capacitor C1 in series. The first end of the primary-side winding 122 is coupled to a node between the first switch Q1 and the second switch Q2, and the second end of the primary-side winding 122 is coupled to a node between the first capacitor C1 and the second capacitor C2. The PWM signal group PWM has a first control signal S1 of controlling the first switch Q1 and a second control signal S2 of controlling the second switch Q2. The controller 20 provides the control signals S1, S2 to respectively switch the switches Q1, Q2 according to a feedback signal Sf transmitted from the output end 1B so that the isolated converter 10 converts the input voltage Vin into the output voltage Vo. The magnetic bias balance circuit 30 provides the compensation voltage Vc corresponding to the magnetic bias of the transformer 12 to the controller 20 according to the winding voltage Vw so that the controller 20 adjusts the duty cycle of the control signals S1, S2 to correct the magnetic bias of the transformer 12, thereby achieving the effect of magnetic bias balance. In one embodiment, the waveform of correcting the magnetic bias by the isolated conversion apparatus 1' is similar to that shown in FIG. 5A and FIG. 5B. When the duty cycle of the winding voltage Vw in the positive half cycle is greater, the duty cycle of the first control signal S1 is decreased; when the duty cycle of the winding voltage Vw in the negative half cycle is greater, the duty cycle of the second control signal S2 is decreased.

In one embodiment, the secondary-side circuit 16 may be a full-bridge circuit shown in FIG. 4A and FIG. 4B, and it can also be a center-tapped rectifier circuit, which can be implemented in accordance with the actual requirements of the circuit. Although the magnetic bias balance circuit 30 can also use the voltage of the secondary-side winding 124 to control the magnetic bias balance, the structure of the secondary-side winding 124 will be different (such as a single-winding structure or a center-tapped structure) due to the different circuit types of the secondary-side circuit 16. Therefore, the magnetic bias balance circuit 30 cannot be universally applied to all the circuit structures of the secondary-side circuit 16. Especially in the center-tapped winding, the parameters of the two windings cannot be made completely the same, which will result in the effect that even if the magnetic bias balance is controlled, the complete magnetic bias balance cannot be achieved. The advantage of the magnetic bias balance circuit 30 of the present disclosure using the primary-side winding 122 to control the magnetic bias balance is that regardless of whether the switch bridge arm 14 on the primary side is one bridge arm or two bridge arms (as shown in FIG. 4A and FIG. 4B), the magnetic bias balance circuit 30 is universal to achieve the effect of increasing the convenience of use. Moreover, the primary-side winding 122 has only a single winding, and the magnetic bias balance control of the present disclosure can achieve the effect of complete magnetic bias balance.

Accordingly, the isolated conversion apparatus 1 samples the winding voltage Vw across the two ends of the primary-side winding 122 of the transformer 12, the filter circuit (i.e., the sampling circuit 32) acquires the average voltage value of the winding voltage Vw, and the controller (i.e., the offset compensation circuit 34) controls the average voltage value to be zero so as to correct the magnetic bias. The average voltage value of the winding voltage Vw is equal to the product of the voltage and the time (effective duty cycle) so that the magnetic bias compensation of the transformer 12 can be simply completed without using the control method of adding the current sensor and without adding the isolation capacitor, thereby reducing the circuit volume and the circuit cost.

Figure 6A:
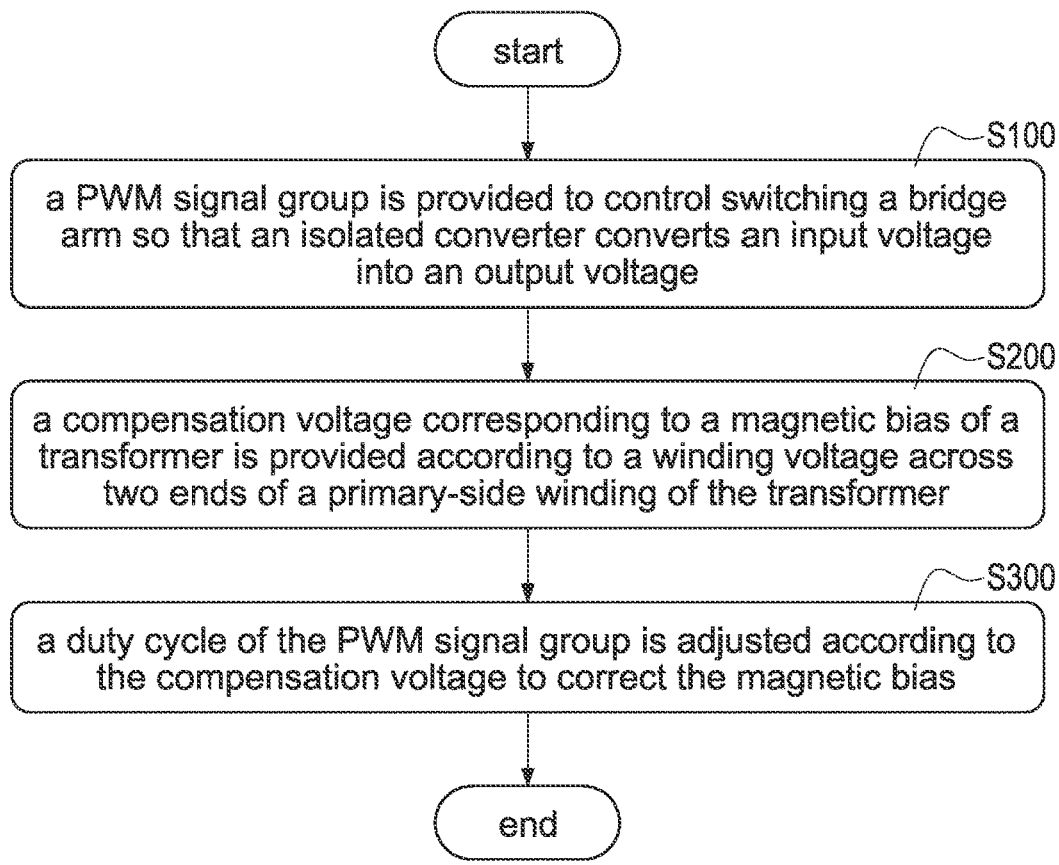
FIG. 6A is a flowchart of a method of controlling magnetic bias balance of the isolated conversion apparatus according to the present disclosure.

Please refer to FIG. 6A, which shows a flowchart of a method of controlling magnetic bias balance of the isolated conversion apparatus according to the present disclosure, and also refer to FIG. 2 to FIG. 5B. The method of controlling magnetic bias balance is suitable for controlling the isolated converter 1 with the transformer 12, and the primary side of the transformer 12 includes at least one switch bridge arm 14. The method of controlling magnetic bias balance includes the following steps. First, a PWM (pulse width modulation) signal group is provided to control switching the bridge arm so that the isolated converter converting an input voltage into an output voltage (S100). The controller 20 provides the PWM signal group PWM to control the switch bridge arm 14 according to a feedback signal Sf transmitted from the output end 1B of the isolated conversion apparatus 1 so that the isolated conversion apparatus 1 converts the input voltage Vin into the output voltage Vo. Afterward, a compensation voltage corresponding to a magnetic bias of the transformer is provided according to a winding voltage across two ends of a primary-side winding of the transformer (S200). The sampling circuit 32 filters, averages, and gains the winding voltage Vw through the filter circuit 324, the operational amplifier 322, the first voltage divider circuit 326, and the second voltage divider circuit 328 to generate an average voltage Va corresponding to an average voltage value of the winding voltage Vw. The second operational circuit 342 provides a second error value Ve2 according to a voltage difference between the average voltage Va and a zero voltage Vz. The proportional integral unit 344 generates a compensation voltage Vc corresponding to a direction and a magnitude of the magnetic bias according to the second error value Ve2, and provides the compensation voltage Vc to the PWM circuit 26. Finally, the duty cycle of the PWM signal group is adjusted according to the compensation voltage to correct the magnetic bias (S300). The PWM circuit 26 adjusts the duty cycle of the PWM signal group PWM according to the compensation voltage Vc to correct the magnetic bias.

Figure 6B:
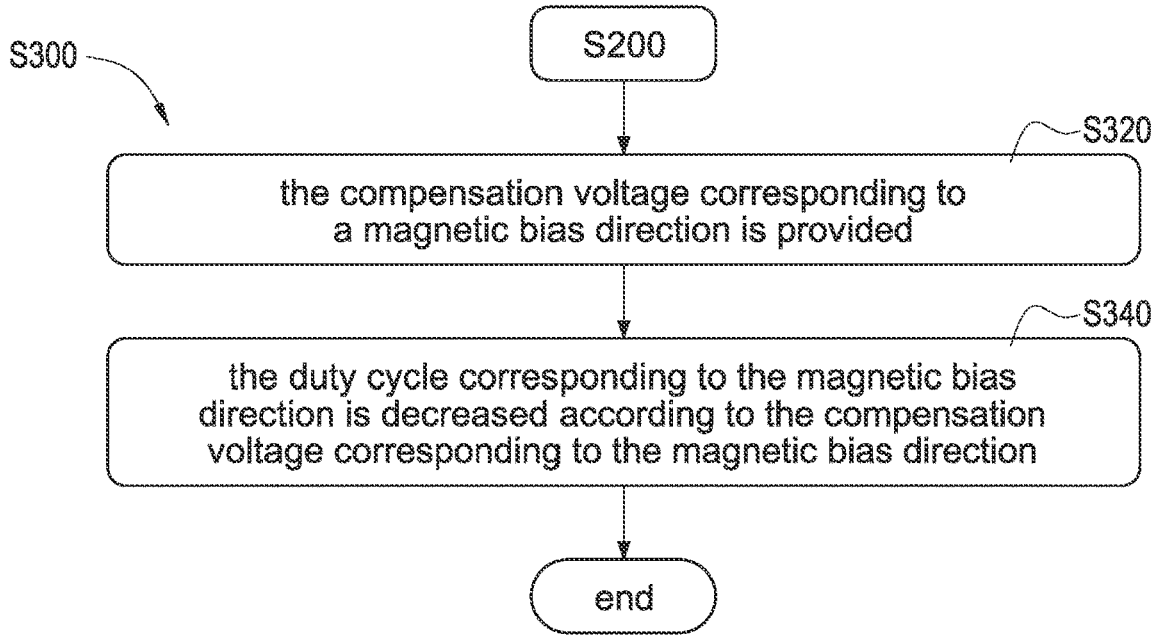
FIG. 6B is a flowchart of a method of adjusting a duty cycle of the isolated conversion apparatus according to the present disclosure.

Please refer to FIG. 6B, which shows a flowchart of a method of adjusting a duty cycle of the isolated conversion apparatus according to the present disclosure, and also refer to FIG. 2 to FIG. 6A. The step (S300) includes the following steps. The compensation voltage corresponding to the magnetic bias direction is provided (S320). The compensation voltage Vc provided by the magnetic bias balance circuit 30 corresponds to a magnetic bias direction of the transformer 12, and the magnetic bias direction is a direction of positive half-cycle bias or a direction of negative half-cycle bias. Afterward, the duty cycle of the control signal corresponding to the magnetic bias direction is decreased according to the compensation voltage corresponding to the magnetic bias direction (S340). When the isolated converter 10 of the isolated conversion apparatus 1 is a full-bridge converter and the magnetic bias direction of the transformer 12 is positive, an effective duty cycle of the winding voltage Vw in the positive half cycle is greater than that in the negative half cycle. At this condition, the compensation voltage Vc provided by the magnetic bias balance circuit 30 is positive according to the winding voltage Vw. The controller 20 decreases the duty cycle of the first control signal S1 and the duty cycle of the fourth control signal S4 according to the positive compensation voltage Vc, and otherwise, the controller 20 decreases the duty cycle of the second control signal S2 and the duty cycle of the third control signal S3.

When the isolated converter 10 of the isolated conversion apparatus 1 is a half-bridge converter and the magnetic bias direction of the transformer 12 is positive, the duty cycle of the winding voltage Vw in the positive half cycle is greater than that in the negative half cycle. At this condition, the compensation voltage Vc provided by the magnetic bias balance circuit 30 is positive according to the winding voltage Vw. The controller 20 decreases the duty cycle of the first control signal S1 according to the positive compensation voltage Vc, and otherwise, the controller 20 decreases the duty cycle of the second control signal S2.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An isolated conversion apparatus with magnetic bias balance control, comprising:
    an isolated converter comprising a transformer with a primary side, and the primary side having a primary-side winding and at least one switch bridge arm,
    a controller coupled to the at least one switch bridge arm, and configured to provide a PWM (pulse width modulation) signal group to control the at least one switch bridge arm, and
    a magnetic bias balance circuit coupled to two ends of the primary-side winding and the controller, and configured to provide a compensation voltage to the controller according to an average voltage value of a winding voltage across the two ends of the primary-side winding,
    wherein the controller is configured to adjust a duty cycle of the PWM signal group according to the compensation voltage.

2. The isolated conversion apparatus as claimed in claim 1, wherein the magnetic bias balance circuit comprises:
    a sampling circuit coupled to the two ends of the primary-side winding, and configured to generate an average voltage corresponding to the average voltage value, and
    an offset compensation circuit coupled to the sampling circuit, and configured to provide the compensation voltage according to the average voltage and a zero voltage.

3. The isolated conversion apparatus as claimed in claim 2, wherein the sampling circuit is a differential filter circuit, and the differential filter circuit comprises:
    an operational amplifier having a first input end, a second input end, and an output end; the output end coupled to the offset compensation circuit,
    a filter circuit coupled to the two ends of the primary-side winding,
    a first voltage divider circuit having a first resistor and a second resistor connected to the first resistor in series; the first resistor coupled to the filter circuit, and two ends of the second resistor respectively coupled to the first input end and the output end, and
    a second voltage divider circuit having a third resistor and a fourth resistor connected to the third resistor in series; the third resistor coupled to the filter circuit, and two ends of the fourth resistor respectively coupled to the second input end and a negative end.

4. The isolated conversion apparatus as claimed in claim 3, wherein the filter circuit comprises:
    a first filter resistor having a first end and a second end; the first end coupled to a first end of the primary-side winding and the second end coupled to the first resistor,
    a second filter resistor having a first end and a second end; the first end coupled to a second end of the primary-side winding and the second end coupled to the third resistor, and
    a filter capacitor having a first end and a second end; the first end coupled to the second end of the first filter resistor and the second end coupled to the second end of the second filter resistor.

5. The isolated conversion apparatus as claimed in claim 2, wherein the offset compensation circuit is a proportional integral controller, and the proportional integral controller comprises:
    an operational circuit coupled to the sampling circuit, and configured to provide an error value according to a voltage difference between the average voltage and the zero voltage, and
    a proportional integral unit configured to receive the error value, and generate the compensation voltage according to the error value.

6. The isolated conversion apparatus as claimed in claim 1, wherein the at least one switch bridge arm comprises:
    a first bridge arm having a first switch and a second switch connected to the first switch in series, and
    a capacitor assembly connected to the first bridge arm in parallel, and having a first capacitor and a second capacitor connected to the first capacitor in series,
    wherein a first end of the primary-side winding is coupled to a node between the first switch and the second switch, and a second end of the primary-side winding is coupled to a node between the first capacitor and the second capacitor; the PWM signal group has a first control signal of controlling the first switch and a second control signal of controlling the second switch.

7. The isolated conversion apparatus as claimed in claim 6, wherein the compensation voltage provided from the magnetic bias balance circuit is corresponding to a first magnetic bias direction of the transformer, and the controller decreases the duty cycle of the first control signal according to the compensation voltage corresponding to the first magnetic bias direction.

8. The isolated conversion apparatus as claimed in claim 6, wherein the compensation voltage provided from the magnetic bias balance circuit is corresponding to a second magnetic bias direction of the transformer, and the controller decreases the duty cycle of the second control signal according to the compensation voltage corresponding to the second magnetic bias direction.

9. The isolated conversion apparatus as claimed in claim 1, wherein the at least one switch bridge arm comprises:
    a first bridge arm having a first switch and a second switch connected to the first switch in series, and
    a second bridge arm connected to the first bridge arm in parallel, and having a third switch and a fourth switch connected to the third switch in series,
    wherein a first end of the primary-side winding is coupled to a node between the first switch and the second switch, and a second end of the primary-side winding is coupled to a node between the third switch and the fourth switch; the PWM signal group has a first control signal of controlling the first switch, a second control signal of controlling the second switch, a third control signal of controlling the third switch, and a fourth control signal of controlling the fourth switch.

10. The isolated conversion apparatus as claimed in claim 9, wherein the compensation voltage provided from the magnetic bias balance circuit is corresponding to a first magnetic bias direction of the transformer, and the controller decreases the duty cycle of the first control signal and the duty cycle of the fourth control signal according to the compensation voltage corresponding to the first magnetic bias direction.

11. The isolated conversion apparatus as claimed in claim 9, wherein the compensation voltage provided from the magnetic bias balance circuit is corresponding to a second magnetic bias direction of the transformer, and the controller decreases the duty cycle of the second control signal and the duty cycle of the third control signal according to the compensation voltage corresponding to the second magnetic bias direction.

12. A method of controlling magnetic bias balance of an isolated conversion apparatus, the isolated conversion apparatus comprising an isolated converter, and the isolated converter comprising a transformer and at least one switch bridge arm coupled to a primary side of the transformer, the method comprising steps of:
- (a) providing a PWM (pulse width modulation) signal group to control switching the at least one bridge arm so that the isolated converter converting an input voltage into an output voltage,
- (b) providing a compensation voltage corresponding to a magnetic bias of the transformer according to a winding voltage across two ends of a primary-side winding of the transformer, and
- (c) adjusting a duty cycle of the PWM signal group according to the compensation voltage to correct the magnetic bias.

13. The method of controlling magnetic bias balance as claimed in claim 12, wherein the step (b) comprises steps of:
- (b1) generating an average voltage corresponding to an average voltage value of the winding voltage,
- (b2) providing an error value according to a voltage difference between the average voltage and a zero voltage, and
- (b3) generating the compensation voltage according to the error value.

14. The method of controlling magnetic bias balance as claimed in claim 12, wherein the PWM signal group has a first control signal and a second control signal of controlling the at least one switch bridge arm, and the step (c) comprises steps of:
- (c11) providing the compensation voltage corresponding to a first magnetic bias direction of the magnetic bias, and
- (c12) decreasing the duty cycle of the first control signal according to the compensation voltage corresponding to the first magnetic bias direction.

15. The method of controlling magnetic bias balance as claimed in claim 12, wherein the PWM signal group has a first control signal and a second control signal of controlling the at least one switch bridge arm, and the step (c) comprises steps of:
- (c21) providing the compensation voltage corresponding to a second magnetic bias direction of the magnetic bias, and
- (c22) decreasing the duty cycle of the second control signal according to the compensation voltage corresponding to the second magnetic bias direction.

16. The method of controlling magnetic bias balance as claimed in claim 12, wherein the PWM signal group has a first control signal, a second control signal, a third control signal, and a fourth control signal of controlling the at least one switch bridge arm, and the step (c) comprises steps of:
- (c31) providing the compensation voltage corresponding to a first magnetic bias direction of the magnetic bias, and
- (c22) decreasing the duty cycle of the first control signal and the duty cycle of the fourth control signal according to the compensation voltage corresponding to the first magnetic bias direction.

17. The method of controlling magnetic bias balance as claimed in claim 12, wherein the PWM signal group has a first control signal, a second control signal, a third control signal, and a fourth control signal of controlling the at least one switch bridge arm, and the step (c) comprises steps of:
- (c41) providing the compensation voltage corresponding to a second magnetic bias direction of the magnetic bias, and
- (c22) decreasing the duty cycle of the second control signal and the duty cycle of the third control signal according to the compensation voltage corresponding to the second magnetic bias direction.

* * * * *